R. A. KEESE.
TRACTOR CULTIVATOR.
APPLICATION FILED OCT. 30, 1916.

1,383,637.

Patented July 5, 1921.
2 SHEETS—SHEET 1.

Inventor.
Richard A. Keese.
by Edward A. Strauss
Atty.

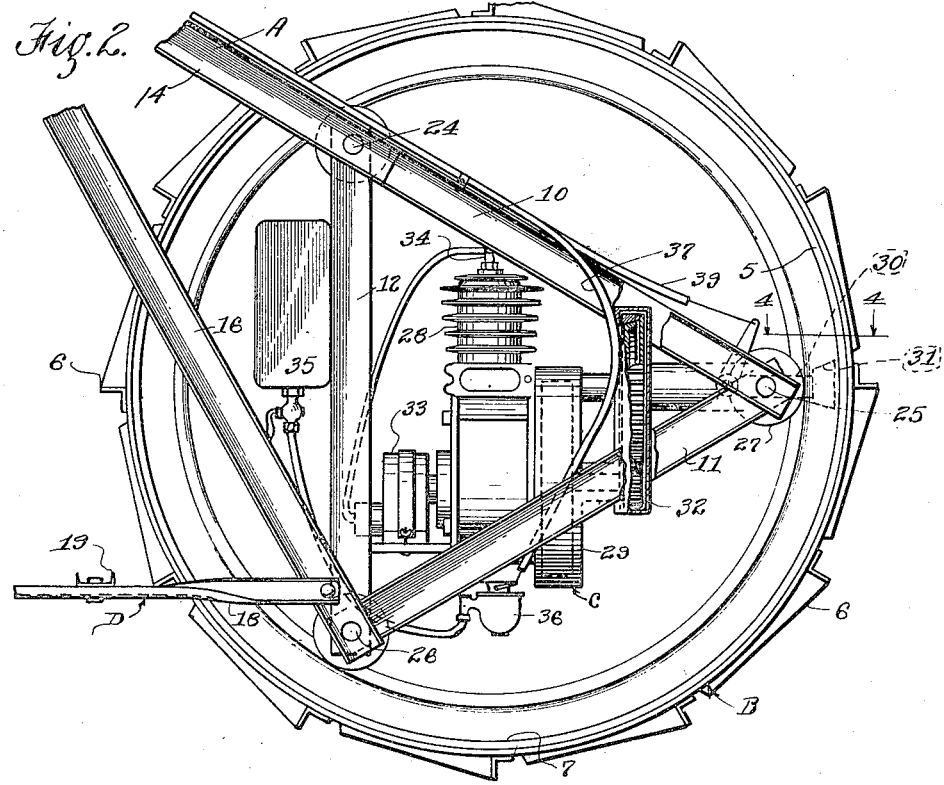
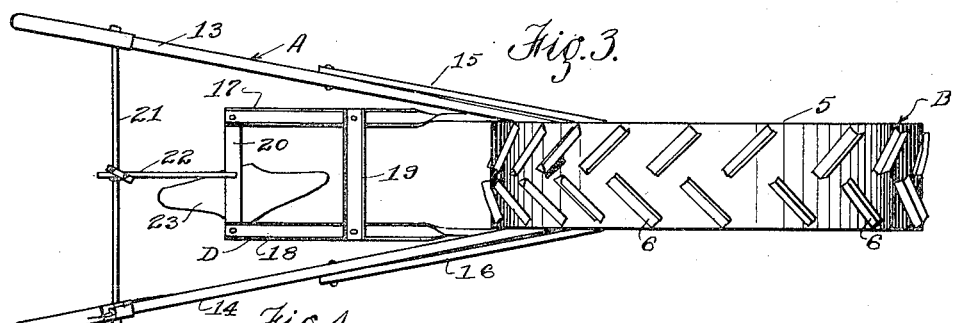
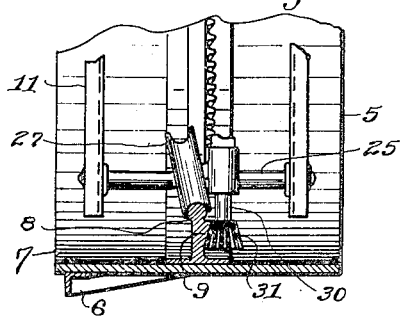

UNITED STATES PATENT OFFICE.

RICHARD A. KEESE, OF LOS ANGELES, CALIFORNIA.

TRACTOR-CULTIVATOR.

1,383,637. Specification of Letters Patent. Patented July 5, 1921.

Application filed October 30, 1916. Serial No. 128,592.

*To all whom it may concern:*

Be it known that I, RICHARD A. KEESE, a citizen of the United States of America, residing at Los Angeles, in the county of Los Angeles, State of California, have invented new and useful Improvements in Tractor-Cultivators, of which the following is a specification.

An object of this invention is to provide a motor tractor of such construction that an engine of maximum size may be housed within an annular wheel of a given diameter and whereby greater strength for a given weight is secured, and longer life without racking is assured.

Other objects and advantages may appear from the accompanying drawings, the subjoined detail description and the appended claims.

The accompanying drawings illustrate the invention.

Fig. 2 is a side elevation showing the trator with parts broken away and parts in section.

Fig. 3 is a plan view.

Fig. 4 is a section through the ground wheel as seen on the line 4—4 of Fig. 2.

Figure 1:
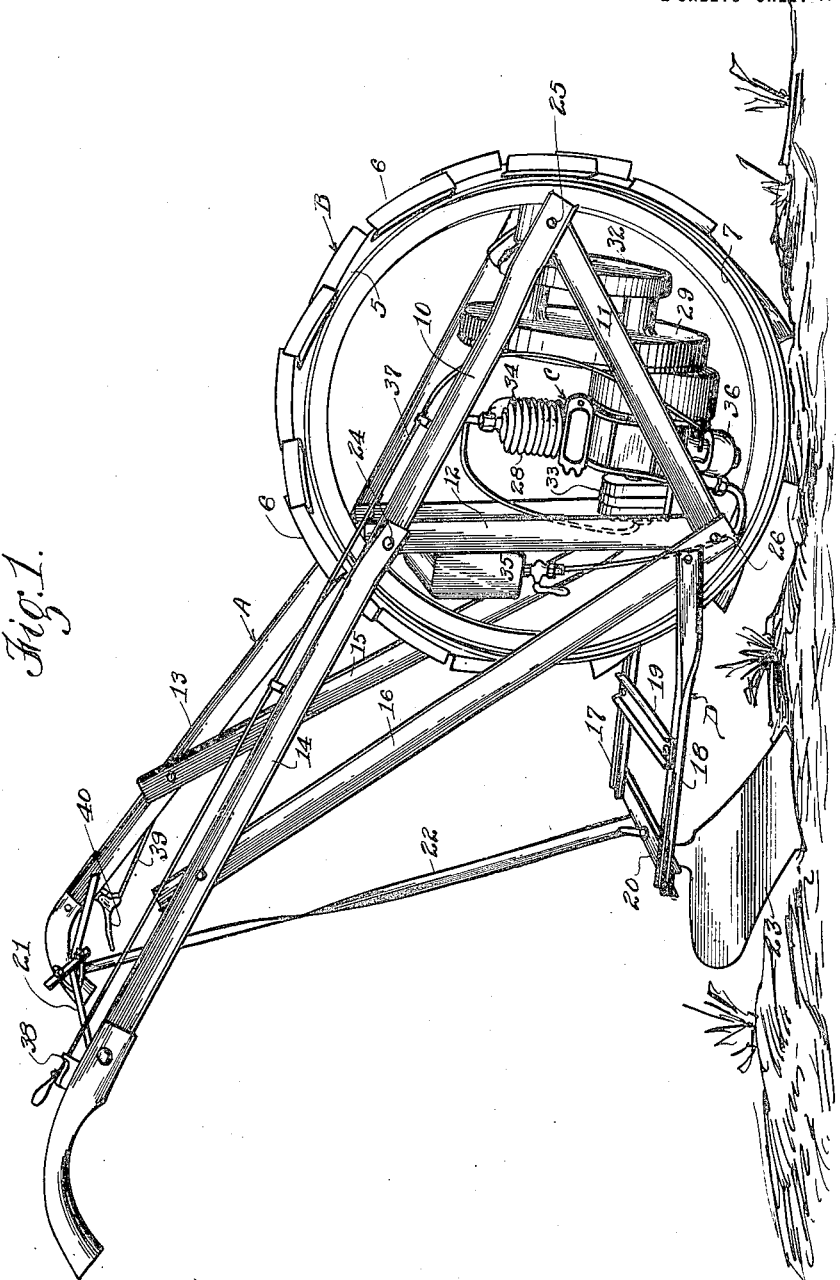
Figure 1 is a perspective view of a cultivator.

I have shown my invention embodied in a cultivator. A frame "A" has mounted thereon a tractor wheel "B," and disposed within the tractor wheel is an engine "C". Secured to the frame "A" is a subframe "D" arranged for holding the shovel.

Referring more particularly to the drawings, the tractor wheel "B" comprises a spokeless ground wheel 5 upon whose rim are secured shoes 6 for increasing the traction between the ground and the wheel. An inwardly extending rib 7 is disposed on the wheel 5 and is preferably integral therewith. Rib 7 has formed thereon a rail 8 upon which trunnions ride and forms an annular bearing therefor. One side of the rib is provided with teeth forming an internal bevel gear 9 and serving for driving the wheel.

Frame "A" comprises three bars 10, 11 and 12 secured together in triangular form, and a corresponding group of bars at the opposite side of the wheel. Guiding handles 13 and 14 are secured to the upper members of the triangular group of bars and braced by bars 15 and 16. Extending rearwardly from the main frame and at the bottom thereof is the sub frame "B" consisting of side bars 17 and 18 with cross pieces 19 and 20. A cross piece 21 extends between handles 13 and 14, and secured thereto and to cross bar 20 on the sub frame is a brace 22. Detachably secured to cross bar 20 by any suitable means is a shovel steel 23. It is obvious that any other suitable agricultural tool may be secured to bar 20, thereby changing the character of the implement. At each corner of the triangular group of bars in the frame, spacing the latter are shafts 24, 25 and 26 upon which are mounted trunnion wheels. The trunnion wheels are grooved to coöperate with rail 8 and rotatably support the latter. The trunnion wheel 27 mounted on shaft 25 is disposed at an angle to the rail 8 to counteract the thrust of the driving pinion, as will be described later.

The power plant "C" is completely mounted within wheel "B", and comprises a gas engine 28, and a housing 29 containing reduction gearing. A driving shaft 30 has a bevel pinion 31 upon one end thereof meshing with the inernal bevel gear 9. Disposed between the gearing in housing 29 and the shaft 30, is a clutch suitably inclosed within a housing 32. To counteract the side thrust of bevel pinion. 31, trunnion wheel 27 is turned at an angle thereto as shown in Fig. 4. A generator 33 for ignition is electrically connected to the spark plug 34. Mounted on the frame is a gasolene tank 35 connected by piping to carbureter 36. A throttle control rod 37 extends from the throttle valve of the engine along handle 14 to a lever 38 disposed in a position convenient for operation. Extending along handle 13 and secured to the clutch is a clutch control rod 39. A lever 40 for operating the latter is disposed in convenient position on handle 13.

It is obvious that I have provided an implement of about the same size as a hand cultivator or plow, but provided with tractor means for driving the same. The implement is as easily guided as any walking plow or harrow and is readily controlled. The tractor engine is started in any suitable manner. The speed is readily controlled from the throttle and the engine may be thrown in or out of operation by means of the clutch control lever.

The trunnions 22 operate as antifriction bearings coacting with the wheel near the top and also near the bottom of the traction wheel B, and said antifriction bearings also operate to form a connection between the frame and the wheel at a horizontal medial plane at about the level of the axis of the wheel, thus giving a purchase for twisting and turning the tractor wheel for the purpose of guiding the implement. As will be seen from Figs. 2 and 3, the engine which is operably connected to the wheel to drive the same, is entirely housed within the inclosure formed by the annular tractor wheel B, and practically the whole height of the space within the annulus is available for receiving the engine and the parts which operably connect it to the wheel, so that the engine can be of comparatively large dimensions up and down within the wheel which has no axle and is therefore free from any element to interfere with the accommodation of the engine.

What is claimed is:

1. In combination with an annular tractor wheel; a triangular frame mounted by antifriction bearings within said annular wheel; an implement frame connected to the lower portion of said triangular frame; an engine carried by said triangular frame and operably connected to drive said annular wheel, and handles connected to the upper portion of said triangular frame.

2. The combination with an annular traction wheel of a triangular frame and three antifriction bearings; said bearings being connected to the triangular frame at the angles thereof and mounting said triangular frame within said wheel; one of said angles being at the lower portion, another at the upper portion, and the third at the intermediate level of said wheel; an implement frame connected to the triangular frame at the lower portion thereof and handles extending from the triangular frame at the upper portion thereof.

In witness that I claim the foregoing I have hereunto subscribed my name this 4th day of October, 1916.

RICHARD A. KEESE.